United States Patent Office 2,760,917
Patented Aug. 28, 1956

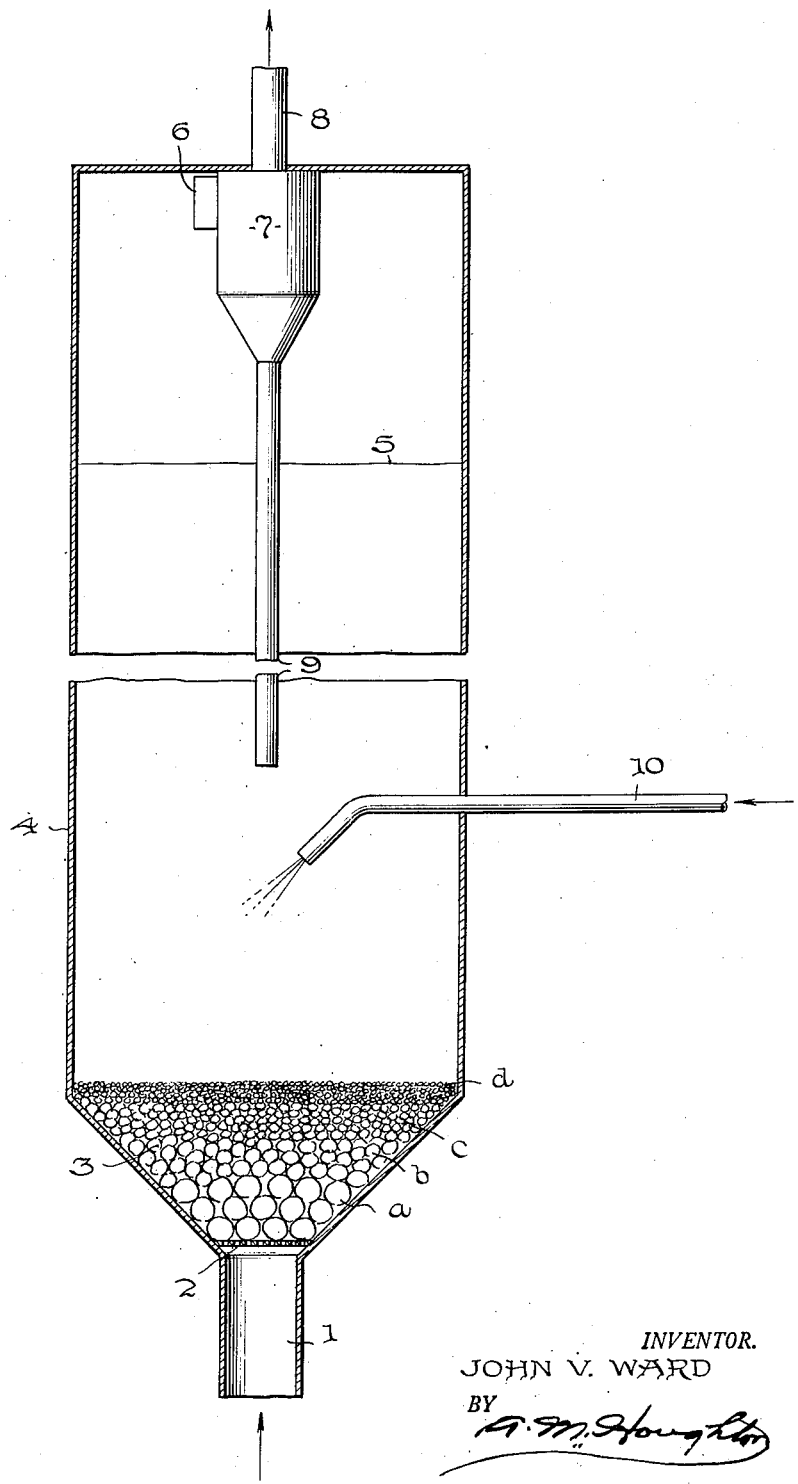

2,760,917

FLUIDIZED CATALYTIC PROCESS FOR THE DESTRUCTIVE HYDROGENATION OF HYDROCARBONS

John V. Ward, Oakmont, Pa., assignor to Gulf Research & Development Company, Pittsburgh, Pa., a corporation of Delaware Application September 28, 1951, Serial No. 248,709

4 Claims. (Cl. 196—53)

This invention relates to an improved process and apparatus for carrying out a fluidized catalytic conversion. In particular, the invention provides an improved method and means for achieving uniform distribution of fluidizing gas over the entire cross-sectional area of the reaction zone in a fluidized catalytic operation. The invention has particular value in connection with fluidized catalytic processes in which a low linear velocity fluidizing gas is employed in the reactor.

Fluidized catalytic processes are well known for carrying out various chemical reactions and have found particularly wide acceptance in the field of petroleum refining. In general these processes involve the upward passage of a fluidizing gas, which gas may comprise a reactant, into a bed of finely divided catalytic particles at a velocity sufficient to provide a "hindered settling" effect with respect to the catalyst particles. Reaction products are separated from the fluidized catalyst, removed and recovered.

In all such operations, uniform distribution of the fluidizing gas over the entire cross-section of the reaction zone is desired in order that all of the catalyst in the reaction zone may be maintained in fluidized form, with the result that all of the catalyst is utilized in effecting the reaction. It is known in ordinary high-velocity fluidized catalytic processes, such as, for example, fluidized catalytic cracking of hydrocarbon oils, to provide various means, such as gratings or perforated plates, to effect a more uniform distribution of the fluidizing gas. These known distribution means, however, are not always satisfactory for effecting uniform distribution of feed in fluidized catalytic operations which utilize low-velocity flow of fluidizing gas. Such operations may be involved where, for example, a relatively longer contact time is desired, or where relatively high pressures are involved. In the latter case the compression effect of the elevated pressure on the fluidizing gas reduces the volume thereof to such an extent that it is normally considered uneconomical to attempt to duplicate the flow rates of the order encountered in ordinary high-velocity fluidized catalytic operations. Low velocity fluidizing gas flow in the reactor may also be desirable from the standpoint of reducing catalyst attrition, catalyst carryover, and the size of the reactor.

For whatever reason employed, low flat rates, through the reaction zone, e. g., from about 0.01 foot per second to about 0.3 foot per second, may present a distributing problem in fluidized catalytic operations. The tendency is, in the case of ordinary distribution means, for the gas to fluidize only a small portion of the catalyst in the reaction zone. The gratings, etc., used in conventional high-velocity fluidized catalytic procedures in many instances do not provide a baffling effect or pressure drop adequate to effect a uniform distribution of the feed across the entire cross-section of the reactor. Moreover, if some of the openings in such gratings are covered or closed in order to increase the pressure drop through those remaining, stagnant zones of catalyst may be formed on the upper surfaces of the distributor between the openings therein. These stagnant catalyst zones are conducive to a high rate of coke formation and cause hot spots during the regeneration period (where regeneration is carried out in the reaction vessel), which hot spots are damaging to the apparatus and catalyst alike.

The difficulties described above in connection with low-velocity fluidized catalytic processes may be aggravated in the case of the so-called "fluidized fixed bed" type of operations, i. e., those fluidized catalytic operations in which catalyst is neither added to nor removed from the reaction zone in substantial amounts throughout the on-stream period. This is because the normal degree of catalyst circulation provided by the introduction and withdrawal of catalyst is absent, with the result that catalyst circulation within the reactor may be substantially poorer.

It has been suggested to employ distributor elements comprising porous ceramic or metallic plates for effecting uniform distribution on fluidizing gas in certain fluidized catalytic procedures. While these elements may permit a sufficient pressure drop to provide a somewhat more uniform distribution, at least in the beginning stages of operation, they are subject to warping, cracking and plugging by entrained solids in the gaseous feed, by carbonization of the reactant, by catalyst, and in some cases, by corrosion of the element itself. Where the distributor becomes warped, cracked, or plugged, the distribution of the fluidizing gas becomes non-uniform. Moreover, these elements are expensive to manufacture, install and maintain. A complicated mounting and manufacturing problem is involved, since the elements must be machined for a tight fit and yet adequate provision must be made for expansion due to heat. Installation of such tight fitting elements is quite difficult. Furthermore, since these elements effect distribution by means of a pressure differential across the distributor, the operational expenses may be increased considerably because of the necessity of maintaining higher pressures than required in the reactor.

It is a prime object of the invention to provide an improved method and apparatus for effecting more uniform distribution of fluidizing gas and more uniform fluidization of catalyst. It is a further object to provide a process and apparatus for achieving more uniform distribution (and thus uniform catalyst fluidization) of low-velocity fluidizing gas in a fluidized fixed bed catalytic operation. A more detailed object is to provide an improved distributing means for achieving uniform distribution of fluidizing gas in processes of the type described, which distributing means is inexpensive, easily installed, easily maintained, and which does not cause an appreciable pressure drop. A further object is to provide a process and apparatus which avoid appreciable or protracted plugging of distributor surface openings. An additional object is to provide a process and apparatus of the type described in which a carbonizable reactant, which is at least partly in the liquid phase at reaction conditions, may be more thoroughly converted without catalyst agglomeration. An important object is to remove or alleviate appreciably difficulties which may be encountered during processing with one or more of the following: low-velocity fluidizing gas, high-boiling hydrocarbon oil at least partly in the liquid phase at reaction conditions, high pressure, and fluidized fixed bed operation. A limited object is to provide an improved distribution means which may be employed in existing equipment without appreciable modification of the latter.

These and related objects are accomplished by my invention which comprises providing a main stream of fluidizing gas and successively sub-dividing this fluidizing gas ultimately to provide at the surface of introduction into a reaction zone a plurality of closely adjacent, fine gas streams which are distributed substantially uniformly over the entire cross-section of the reaction zone. The subdivided fluidizing gas is uniformly passed upward into the reaction zone where a reaction is effected. Catalyst is separated from reaction products and the latter are removed from the reaction zone. The subdivision and distribution mentioned are accomplished by passing said main stream of fluidizing gas upwardly through a relatively stationary bed of discrete, inert, refractory particles, said bed having an upper layer containing relatively finely divided particles and at least one lower supporting layer containing substantially coarser particles of a size and weight sufficient to avoid displacement by the main stream of fluidizing gas. One modification of the invention involves periodically increasing the linear velocity of the fluidizing gas to the extent that at least a portion of the top layer of smallest particles will be momentarily partially fluidized in order to shake loose any catalyst particles and solidified carbonaceous deposit tending to crust over the openings at the upper surface of the distributor. A preferred environment for the invention involves a fluidized fixed bed catalytic procedure and particularly those carried out at high pressures. The invention also involves apparatus suitable to carry out the process.

In the accompanying description and drawing certain preferred embodiments have been described. It is understood that these are by way of illustration only and are not to be considered as limiting.

Referring briefly to the attached drawing there is shown in schematic form a preferred form of an apparatus suitable to carry out the functions of the invention.

Referring now in more detail to the attached drawing, a gaseous feed, i. e., the fluidizing gas, which gas may comprise one or more reactants or an inert gas, enters the system through line 1. In a preferred reaction, the destructive hydrogenation of hydrocarbon oils, this gas may comprise hydrogen preheated and compressed by means not shown. It may also include in the proportion desired additional gaseous reactant to be converted, such as for example preheated and compressed vapors of a petroleum hydrocarbon. The gaseous feed passes from line 1 through grating 2, which acts as a support for the distributing element, into the distributor 3. The particular distributor shown employs four layers of discrete, inert, refractory granules of varying size. These layers are identified in the drawing as a, b, c and d. The particles within the layers, a, b, c and d are of progressively decreasing size in the order named.

Upon first contacting the lowest layer, i. e., that containing the largest particles, the initial impact of the gaseous feed, which is greatest at the reactor inlet, is reduced, and a relatively coarse subdivision of the main stream into a plurality of smaller streams is effected by means of the physical baffling effect of the layer of particles.

It is emphasized that the subdivision and distribution accomplished in the bottom layer and layers thereabove as well is primarily effected by means of physical baffling of the gases rather than pressure drop. This feature is important, since an appreciable pressure drop, such as encountered with a porous plate, may increase the operating expenses substantially.

The subdivided feed next enters layer b which contains smaller particles. The gas is further subdivided and distributed by the particles of this layer. The subdivision and distribution described continues through the successive layers of particles ultimately to provide, at the upper surface of layer d, i. e., the surface of introduction into the reaction zone, a very large number of closely adjacent, fine gaseous feed streams, which are substantially uniformly distributed over the entire cross-section of the reactor. The thus distributed feed exerts a lifting effect upon the catalyst within the reaction zone, which effect is substantially equal for all sections of the reactor.

As pointed out previously the particles in the bottom layer of the distributor bed are of a size and weight sufficient to avoid displacement by the initial impact or jet effect of the main feed stream. Because of the difference in the diameter of the reactor and the inlet line, the velocity of the fluidizing gas or gases in the latter may be of the order of 100 times the velocity in the reactor. Thus these lowest particles must be relatively large in order to resist displacement.

As the main stream of fluidizing gas is subdivided and spread over a larger space by the baffling effect of these coarse particles, the initial gas velocity is reduced greatly. Succeeding particulate layers may therefore be of smaller size without risk of fluidization or substantial displacement. These particles of the succeeding layers should also be of a size and weight sufficient to avoid vigorous displacement or fluidization in order to maintain the distributing effect desired.

It may be noted that although fluidization of the distributor particles is to be avoided, a small degree of shifting or jostling is present within the top layer containing the smallest particles. This shifting is provided by the buoyant effect of the upflowing fluidizing gases. Thus an important advantage is achieved over previously employed rigid distributors of the porous plate type. The continuous rearrangement in the top layer prevents "short-circuiting" of the fine gas streams to form a single channel through the catalyst bed. Thus the term "relatively stationary" as employed in the accompanying description and claims is intended to exclude any fluidization or substantial expansion of the layer of particles, but to include the slight shifting described.

The subdivided feed gas passes upwardly at low linear velocity through the dense phase catalyst through dense bed level 5, and into the dilute phase thereabove. From this zone converted products pass through opening 6 into cyclone separator 7, where most of the entrained catalyst is separated from the product vapors. Product vapors are then removed through line 8, and separated catalyst is returned to the dense phase catalyst bed through dipleg 9. Reactor pressure is maintained by suitable pressure-controlling valve means (not shown) downstream of the reactor.

Line 10 may be employed to introduce one of the reactants. This line is of particular utility when a carbonizable reactant which is at least partially in the liquid phase at reaction conditions, e. g., a high boiling hydrocarbon oil such as topped or reduced crude, is to be converted. This expedient avoids the possibility of slurry formation by the liquid portion of the feed and the smaller particles of the distributor and also avoids the possibility of the formation of a liquid level within the distributor. Such conditions may lead to coking and plugging of the distributor. Introduction of the liquid-containing carbonizable feed well up in the bed avoids agglomeration of catalyst and also effects a more complete conversion of the liquid reactant. This is true, since the liquid feed is introduced in a region of the relatively greater catalyst mobility. Since the rate of catalyst circulation is higher at the place of introduction of the feed than at the bottom of the reaction zone, a given amount of reactant is spread over a larger quantity of catalyst. Thus, a larger amount of catalyst acts on a smaller amount of feed, and "over-wetting" of the catalyst is avoided. If liquid feed is charged, it is preferably introduced into the reactor in combination with a gaseous diluent. In some processes in which only gaseous reactants are charged it may be necessary to charge one reactant through the distributor and one through line 10. For example, one of the gases may tend to decompose or react with the other gas within the distributor to form liquid or solid products which would clog the distributor. This is not normally a primary consideration, however.

As previously noted it is sometimes desirable that the linear velocity of the fluidizing gas be increased periodically and for a brief time to the extent that the top layer of distributor particles may be vigorously disturbed or partially fluidized. To this end an auxiliary fluidizing gas supply (not shown) may be cut into the system when desired.

From the foregoing it will be evident that several of the most important functions of the invention are directly dependent upon the distributor element itself. While substantial variation in the design of this element is permissible, certain precautions must be observed in order to realize the benefits thereof. As briefly discussed above, the desired result is to provide from a single, coarse feed stream a multiplicity of closely adjacent, fine gas streams distributed uniformly over the entire cross-sectional area of the reactor. This is accomplished by successively subdividing and distributing the initial coarse stream, until adequate division and distribution is achieved. As also indicated it is desirable to introduce the subdivided feed through small openings which continually rearrange themselves.

The means employed to effect the described subdivision and distribution is a bed of discrete, inert, refractory particles. Preferably the particles are of at least as great a density as the catalyst to be fluidized. Any particulate material which will be resistant to crumbling and powdering under thermal or mechanical stresses and which will not act chemically and catalytically on any of the material charged to the vessel may be employed. Examples of such materials are fused alumina, stainless steel, Carborundum, or the like. Some or all of the pebbles or particles may be of regular shapes such as spheres, Berl saddles, or Raschig rings, or they may be completely irregular.

The pebble bed distributor described must comprise at least two and preferably more layers of particles, each layer containing particles of different size. The upper layer should contain the smaller particles and the lower layer should contain the larger particles.

Taking up the individual layers in the order in which they are contacted by the feed, the bottom layer must contain particles of relatively large size, since they must be sufficiently large and heavy not to be displaced by the initial impact and jet effect of the feed gas, which is greatest at the reactor inlet. Also these large particles provide a coarse, initial distribution and subdivision of the feed gas. Suitable particle sizes for the lower layer of the distributor may be determined experimentally if desired. They will usually range from about ½₀ to about ⅒ of the diameter of the reactor, or from about two inches to preferably not greater than about six inches in diameter. Particles of substantially larger size than about six inches do not provide the desired degree of distribution or impact reduction, with the result that extra layers of particles are necessary. Too many layers are undesirable, since reactor capacity is reduced. This is particularly important with expensive, high pressure reactors.

The feed passing from the bottom layer of coarse particles is preferably passed through additional layers of smaller particles until it reaches the lower surface of the top layer. The particles of this top layer must be relatively fine in order to provide a large number of closely adjacent feed streams of small diameter. The feed streams must be closely adjacent in order to prevent buildup of catalyst on the surfaces between the openings. The number must be large in order to effect a uniform and equal distribution of the feed over the entire cross-section of the reactor. The diameter of the passages should be small in order to prevent backflow of appreciable amounts of catalyst into the feed line during pressure surges in the reactor, shutdown or changeover periods, etc.

The factors mentioned above are determinative of the maximum particle size which may be tolerated in the top layer. With respect to the minimum size, the primary consideration is that the particles should not be so small as to become fluidized during normal operating conditions.

The maximum particle diameter in the top layer is advantageously less than about 0.2 inch, although up to about 0.5 inch may be tolerated.

The minimum permissible particle diameter for the top distributor layer varies according to the nature of the particles, the nature of the gas and the reaction conditions. The minimum permissible particle diameter may be determined experimentally, by calculation, or by a combination of the two. In calculating the minimum particle size the data and equations described by Wilhelm & Kwauk in "Fluidization of solid particles," Chemical Engineering Progress, volume 44, No. 3, March 1944, pp. 201–18, may be employed. According to this method and, for example, asusming carborundum particles, hydrogen as the fluidizing gas, a temperature of 850° F., a pressure of 800 p. s. i. g., and a linear gas velocity in the reactor of 0.3 ft./sec. (exemplary conditions for destructive hydrogenation of heavy hydrocarbon oils), it may be determined that particles of about 45 mesh or larger will not be fluidized. Preferably the size of the particles is at least about 20 per cent larger than this calculated value so that partial fluidization will also be avoided as well as the complete fluidization as determined by Wilhelm & Kwauk. Thus Carborundum particles of a size of about 30 mesh would be quite satisfactory for the conditions chosen. Preferably the size of the particles in the top layer is chosen near the minimum size to avoid fluidization to provide a maximum degree of shifting or jostling short of any fluidization, or bed expansion.

As has been indicated, one useful modification of the invention involves a periodic temporary increase in the linear velocity of the fluidizing gas in order to disturb more vigorously or partially fluidize the top layer of particles, with the result that any settled catalyst or solidified carbonaceous material tending to partially plug the surface or interstices of the distributor is shaken loose. Also, any tendency toward channeling is eliminated by the altered gaseous flow. This modification also preferably involves the selection of a particle size near the minimum to avoid fluidization not only for the previously discussed reason that maximum shifting is obtained in the top particulate layers during normal operation, but also so as to avoid the necessity of an inordinate increase in the velocity of the fluidizing gas to produce the more vigorous disturbance or partial fluidization desired. The linear velocity necessary to produce this momentary partial fluidization of the smallest particles varies also according to the nature of the particles, the nature of the gas, and the reaction conditions. For any given conditions the particular linear velocity necessary may be determined experimentally or by employing the data and equations of Wilhelm et al. previously noted. Thus, according to the latter method, and assuming Carborundum particles of 30 mesh size in the top layer, a temperature of 850° F., a pressure of 800 p. s. i. g., and hydrogen as the fluidizing gas, a linear velocity of about 0.79 ft./sec. is necessary to fluidize the particles. Again, a velocity about 20 per cent smaller, e. g., about 0.5 or 0.6 ft./sec., is all that is required to achieve partial fluidization.

The composition of the top and bottom granular layers has been discussed in detail. The composition of intermediate layers, where employed, is much less critical. Preferably, the particles of these layers are of progressively decreasing sizes, e. g., where two-inch granules are employed in the bottom layer, a layer of one-inch granules may be employed immediately above, a layer of one-half inch particles above that, a layer of one-fourth inch or smaller particles above that, and a top layer of about 30 mesh or somewhat larger particles. Obviously, the particles of each layer need not be sized exactly alike, and may satisfactorily be within a range of sizes.

Although a progressively decreasing particle size is preferred for the intermediate layers, other arrangements may be employed, such as a mixture of particles of varying size. It must be kept in mind, however, that the intermediate and bottom layers of particles also serve the function of providing support for the layer or layers thereabove. Accordingly, particle arrangements should be chosen which will not permit appreciable downward passage of smaller particles through the interstices of lower layers.

The distributing element described may be employed in either a flat or a cone bottomed reactor. The total height of the distributor bed may be in the range of about one-half to four times the diameter of the reactor. In a cone bottomed reactor, it should fill all of the bottom cone in order that the area of the distributor surface may coincide with the reactor cross-sectional area. A distributor bed of excessive depth is to be avoided, since reactor capacity is reduced thereby.

The depth of the individual layers may vary widely. For example, the bottom layer, containing the largest particles may be as little as one or two particles thick, while the top layer, containing the smallest particles may be as much as a hundred particles thick or more. Factors to be considered are that the reaction space should not be reduced unnecessarily, and that the upper layers not be so thick as to provide a large pressure drop, where this would not be desired. The thickness of the individual layers need only be such that an accidental shift of the particles in the distributor will not be likely to displace one or two size graduations at some point, permitting the smaller particles above to move downward through the lower layers.

The invention may obviously be used in connection with any fluidized catalytic operation in which uniform distribution of fluidizing gas and reactants is desired. However, the greatest advantages are produced in conjunction with fluidized catalytic operations employing a low velocity flow of fluidizing gas in the reactor, since previously employed distribution methods have been ineffective in overcoming the problems peculiar to this type of procedure. The invention is especially adapted for use in processes of the type described which are carried out at high pressure, not only for the reason that the high pressure reactions are normally carried out with low velocity gas flow, but also for the reason that high pressure reactors are subject to occasional pressure surges. In such instances catalyst tends to be blown back into the inlet line. Where a carbonizable reactant is employed, this may lead to plugging of the feed line and is thus to be avoided. The present invention prohibits such blowback of catalyst. The invention is of particular utility in fluidized fixed bed operations, since these operations are particularly susceptible to non-uniform catalyst circulation.

As has been indicated, reactions to which the invention is applicable are any of those effected in the presence of a fluidized catalyst. Examples of such reactions are fluidized catalytic cracking of hydrocarbon oils, and the fluidized catalytic oxidation of naphthalene. Specific examples of reactions which may involve low linear velocity fluidizing gas flow through the reaction zone and/or elevated pressures are the hydrocracking or destructive hydrogenation of hydrocarbon oils, the hydroforming of petroleum hydrocarbons, and hydrocarbon synthesis reactions. The invention is of especial value, since it permits treatment of high boiling, highly carbonizable, liquid hydrocarbon oils, which oils remain at least partially in liquid phase upon initial introduction into the reaction zone. Hydrocracking of such oils by ordinary feed injection methods, particularly at pressures between about 300 and 2000 p. s. i. g. and at temperatures between about 750 and 950° F., may be a difficult procedure and is aided greatly by my invention.

Catalysts which may be employed in the invention are of any of those normally utilized in the particular reaction being carried out and capable of being fluidized at the conditions of the reaction. The particular catalyst employed forms no part of the invention.

Conversion conditions likewise form no part of the invention except in so far as they may involve low linear velocity fluidizing gas and relatively high pressure, e. g., in excess of 300 p. s. i. Otherwise, the conditions are those normally employed for the particular reaction being carried out.

The low linear velocities referred to are those in the range of about 0.01 foot per second to about 0.3 foot per second, which velocities have been found to involve different problems from those normally employed in fluidized catalytic operations.

The invention is advantageous in that it provides a durable, inexpensive, easily installed, and easily maintained distribution element for effecting uniform distribution of fluidizing gas. The invention also is of further advantage in that it provides a distributing means for use in the process of the type described which is not susceptible to warping or cracking and through which flow of fluidized gas may be altered without replacing the entire distributor. An important advantage is that the proposed distributing means may be employed in existing equipment with little or no modification of the latter.

What I claim is:

1. A fluidized catalytic process comprising providing a main stream of fluidizing gas, successively subdividing and distributing said fluidizing gas ultimately to provide at the surface of introduction into a reaction zone a plurality of closely adjacent, fine gas streams of shifting location, which are distributed substantially uniformly over the entire cross-section of the reaction zone, said subdivision and distribution being accomplished by passing said main stream of fluidizing gas upwardly through a relatively stationary bed of discrete, inert, refractory particles, said bed having a top layer containing relatively finely divided particles of a size sufficiently small to prevent any appreciable flow of catalyst particles through said layer and not exceeding about 30 mesh, and of a density sufficiently great that they will not be fluidized at operating conditions, but not so great as to prevent all movement, said density being at least as great as that of the catalyst particles, and a plurality of lower supporting layers containing substantially coarser particles of a size and weight sufficient to avoid displacement by the main stream of fluidizing gas, uniformly passing said fluidizing gas upwardly at lower linear velocity into the reaction zone containing a fluidized catalyst, effecting a reaction, separating reaction products from catalyst, and removing reaction products.

2. A fluidized catalytic process comprising providing a main stream of fluidizing gas, successively subdividing and distributing said fluidizing gas ultimately to provide at the surface of introduction into a reaction zone a plurality of closely adjacent, fine gas streams of shifting location, which are distributed substantially uniformly over the entire cross-section of the reaction zone, said subdivision and distribution being accomplished by passing said main stream of fluidizing gas upwardly through a relatively stationary bed of discrete, inert, refractory particles, said bed having a top layer containing relatively finely divided particles of a size sufficiently small to prevent any appreciable flow of catalyst particles through said layer and not exceeding about 30 mesh, and of a density sufficiently great that they will not be fluidized at operating conditions, but not so great as to prevent all movement, said density being at least as great as that of the catalyst particles, and a plurality of lower supporting layers containing substantially coarser particles of a size and weight sufficient to avoid displacement by the main stream of fluidizing gas, uniformly passing said fluidizing gas upwardly at low linear velocity into the reaction zone containing a fluidized catalyst, effecting a reaction, separating reaction products from catalyst, removing reaction products, and periodically effecting a temporary increase in the velocity of the fluidizing gas sufficient to partially fluidize the uppermost inert particles, whereby plugging of the passages is avoided.

3. In a fluidized fixed bed catalytic destructive hydrogenation process in which hydrogen under relatively high pressure is passed upwardly at a linear velocity between about 0.01 foot per second and about 0.3 foot per second through a reaction zone containing a fluidized fixed bed of catalyst and in which a high boiling hydrocarbon oil that is at least partly in liquid phase upon introduction into the reaction zone is to be converted, the combination therewith of the improvements comprising providing a main stream of hydrogen, successively subdividing and distributing the hydrogen ultimately to provide at the surface of introduction into the reaction zone a plurality of closely adjacent, fine streams of shifting location, which are distributed substantially uniformly over the entire cross-section of the reaction zone, said subdivision and distribution being accomplished by passing said main stream of hydrogen upwardly through a relatively stationary bed of discrete, inert, refractory particles, said bed having a top layer containing relatively finely divided particles of a size sufficiently small to prevent any appreciable flow of catalyst particles through said layer and not exceeding about 30 mesh, and of a density sufficiently great that they will not be fluidized at operating conditions, but not so great as to prevent all movement, said density being at least as great as that of the catalyst particles, and a plurality of lower supporting layers containing substantially coarser particles of a size and weight sufficient to avoid displacement by the main stream of fluidizing gas, uniformly passing the hydrogen upwardly into the reaction zone containing a fluidized destructive hydrogenation catalyst, introducing the liquid-containing high boiling hydrocarbon oil into the fluidized bed of catalyst in a region substantially above said bed of inert particles, destructively hydrogenating the hydrocarbon oil and removing reaction products from the reaction zone.

4. A fluidized catalytic process comprising providing a main stream of fluidizing gas, successively subdividing and distributing said fluidizing gas ultimately to provide at the surface of introduction into a reaction zone a plurality of closely adjacent, fine gas streams of shifting location, which are distributed substantially uniformly over the entire cross-section of the reaction zone, said subdivision and distribution being accomplished by passing said main stream of fluidizing gas upwardly through a relatively stationary bed of discrete, inert, refractory particles, said bed having a top layer containing relatively finely divided particles of a size such that the diameter of the apertures between particles is insufficient to permit appreciable passage of catalyst particles therethrough, and of a density such as to avoid fluidization but such as to permit some shifting at the reaction conditions, and a plurality of lower supporting layers containing substantially coarser particles of a size and weight sufficient to avoid displacement by the main stream of fluidizing gas, uniformly passing said fluidizing gas upwardly at low linear velocity into the reaction zone containing a fluidized catalyst, effecting a reaction, separating reaction products from catalyst, and removing reaction products.

References Cited in the file of this patent

UNITED STATES PATENTS

| | | |
|---|---|---|
| 1,776,876 | Winkler | Sept. 30, 1930 |
| 2,268,187 | Churchill | Dec. 30, 1941 |
| 2,419,323 | Meinert et al. | Apr. 22, 1947 |
| 2,453,740 | Becker | Nov. 16, 1948 |
| 2,460,404 | Ward | Feb. 1, 1949 |
| 2,533,026 | Matheson | Dec. 5, 1950 |
| 2,541,317 | Wilson | Feb. 13, 1951 |
| 2,554,264 | Odell | May 22, 1951 |
| 2,586,818 | Harms | Feb. 26, 1952 |
| 2,631,921 | Odell | Mar. 17, 1953 |

OTHER REFERENCES

"Industrial & Engineering Chemistry," February 1950, page 43A.